July 11, 1939.  J. D. LEITCH  2,165,491
CONTROL OF ALTERNATING CURRENT MOTORS
Filed Oct. 13, 1937  2 Sheets-Sheet 1

INVENTOR.
JOHN D. LEITCH
BY John H. Leonard
his ATTORNEY.

Patented July 11, 1939

2,165,491

UNITED STATES PATENT OFFICE 2,165,491

CONTROL OF ALTERNATING CURRENT MOTORS

John D Leitch, Shaker Heights, Ohio, assignor to The Electric Controller & Manufacturing Company, Cleveland, Ohio, a corporation of Ohio Application October 13, 1937, Serial No. 168,760

16 Claims. (Cl. 172—179)

This invention relates to the control of electric alternating current motors having secondary circuits, and particularly to the control of the switching operations of wound rotor induction motors.

One of the principal objects of the invention is to provide a new and improved means responsive to the electrical characteristics of a circuit of an alternating current motor for controlling the operation of the motor in accordance with said characteristics.

A more specific object is to provide means responsive to the electrical characteristics of a circuit of an alternating current motor for controlling the plugging of the motor in a predetermined relation with said characteristics.

A correlative object is to provide means responsive to the electrical characteristics of a circuit of an alternating current motor and which either may be employed for controlling the acceleration of the motor or employed for plugging of the motor, in accordance with said characteristics.

A further object of the invention is to provide means responsive to electrical characteristics of a circuit of an induction motor to automatically disconnect the induction motor from its power source at or near zero speed after braking power has been applied to the motor.

A more specific object is to provide a relay circuit on which variations in the rotor circuit electrical characteristics may impose either themselves or corresponding variations, without material change, so that the relay may be operated in response to variations in those rotor circuit electrical characteristics necessary for operation of the relay.

Another specific object of the invention is to provide means including an electromagnetic relay and condenser connected so as to eliminate the inductive effects of the relay and its circuit and thereby to render the relay circuit directly responsive to variations in the electrical characteristics of the rotor circuit and cause the relay to be actuated in accordance with the electrical characteristics of the rotor circuit of a wound rotor induction motor.

A further object of the invention is to provide an extremely economical and simple automatic control means for the purposes recited.

Other objects and advantages will become apparent from the following specification, wherein reference is made to the drawings, in which.

Figure 6:
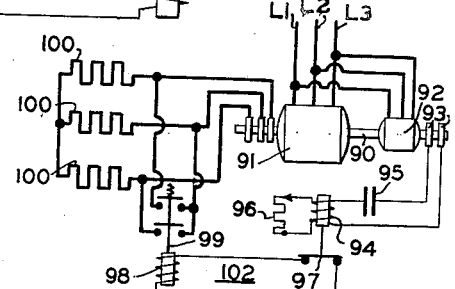
Figure 4:
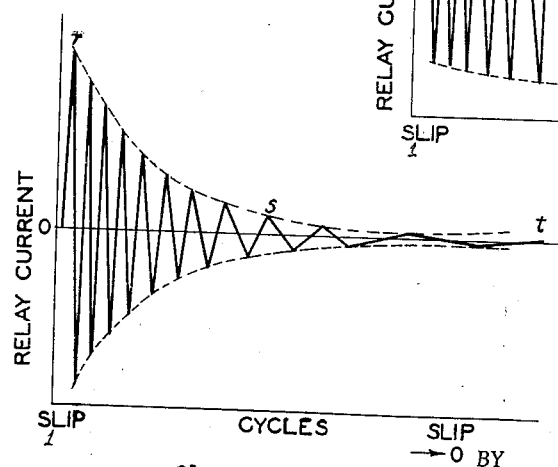
Figure 5:
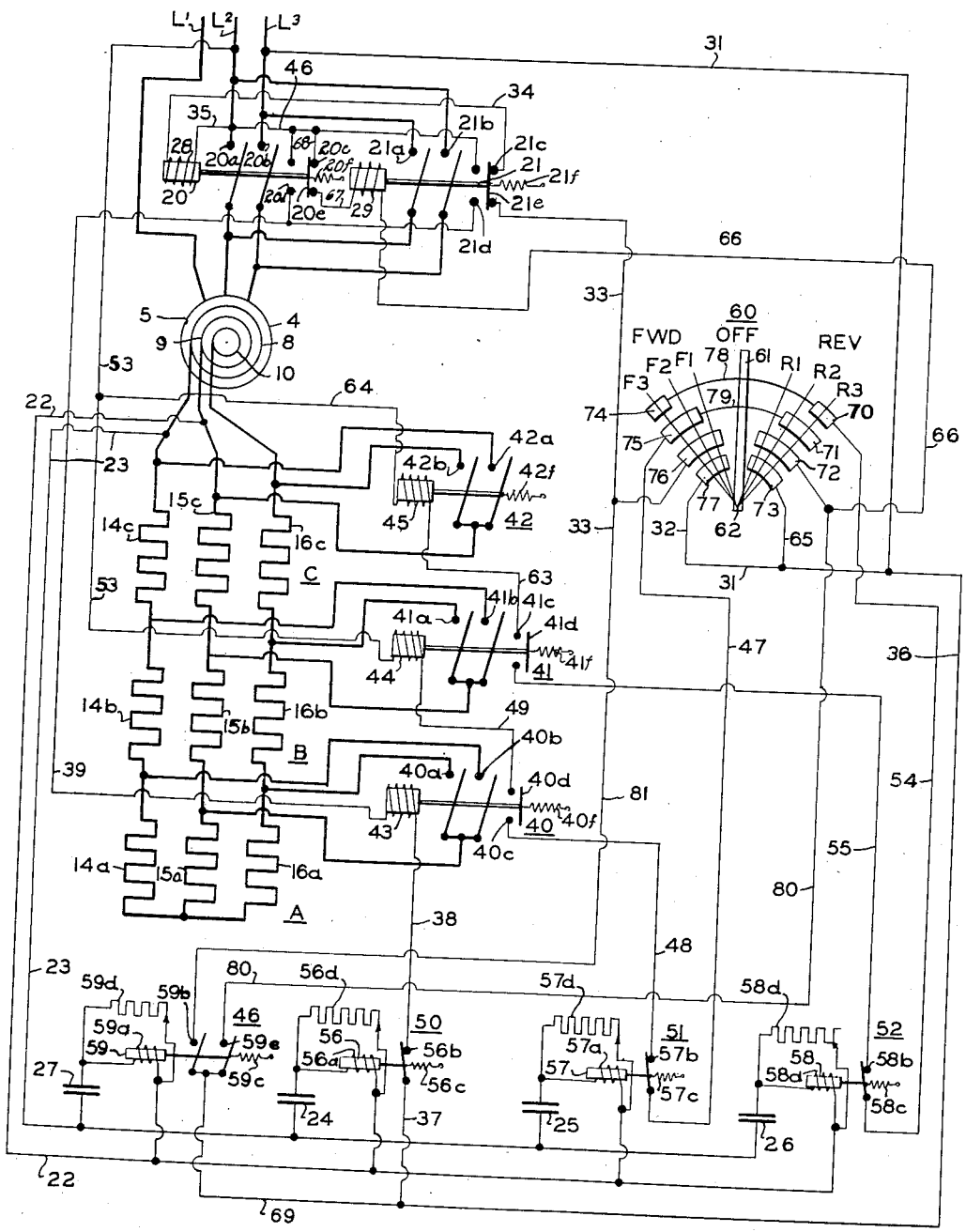

Fig. 4 is a diagrammatic representation of the alternating current induced in the relay circuit of this invention when the relay circuit is connected so as to be energized from a rotor circuit and during acceleration of the rotor; and Fig. 5 is a wiring diagram of a control circuit showing the application of this invention for automatically controlling acceleration and plugging of a wound rotor induction motor, and for disconnecting an induction motor from the power source as it approaches zero speed after reverse power has been applied;

Fig. 6 is a diagrammatic illustration of a modification of the control system.

For purposes of illustration, the present invention is described herein in connection with a wound rotor induction motor, its adaptation to other types of motors being readily apparent from the exemplary disclosure.

Control of acceleration, speed control, and protection during plugging of wound rotor induction motors are generally accomplished by varying the resistance of the rotor circuit, which is a secondary circuit. The value of this resistance can be regulated to permit speed control or proper acceleration of the motor, or a portion of the resistance can be inserted to limit the current during plugging.

Figure 2:
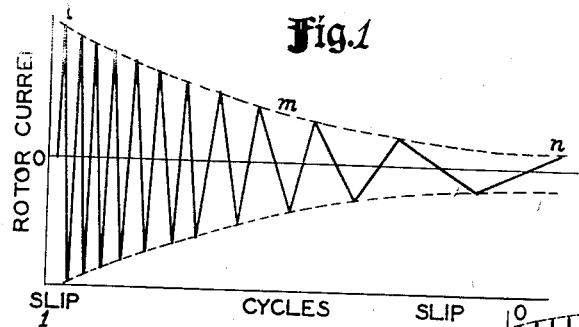
Fig. 2 is a diagrammatic representation of the induced alternating current in a rotor circuit of an induction motor during acceleration of the motor.

Under normal operating conditions, the flux in the air gap of an induction motor is constant and the induced rotor voltage is proportional to the difference in speed of the rotating field of the primary and the actual speed of the rotor. The ratio of this difference in speed to the speed of the rotating primary field is termed the "slip". At standstill, the slip is thus equal to unity, while at full speed the slip closely approaches zero. At the instant when such a motor is plugged, the direction of rotation of the primary field is reversed so that the slip at that instant, before the motor has had an opportunity to slow down, is close to 2. When the primary winding of a wound rotor induction motor is connected to a source of power with the rotor at rest, that is, when the slip is unity, the current induced in the rotor is at the same frequency as that of the source. As the rotor accelerates, the magnitude and frequency of the induced current each become less and less, until at full speed each is at a minimum, the value of each depending upon the load. This is illustrated by Fig. 2, wherein, at the point $l$, at which the slip is unity, the rotor current has a frequency equal to that of the primary current, and, at the point $m$, at which the slip is less than unity, both the frequency and the current magnitude have decreased, while, at point $n$, at which the slip approaches zero and which represents full speed, each has decreased to a much lower value dependent upon the load on the motor.

The electrical characteristics of the rotor circuit are that the frequency of the rotor current is equal to the product of the slip and the primary frequency, and the current decreases with slip. Heretofore, various attempts have been made to automatically control the acceleration of such motors by relays responsive to either the characteristics of the frequency of the current in the rotor circuit or to the magnitude of the current in the rotor circuit.

Those systems responsive to the frequency have generally used vibration relays which actuate contacts when the frequency of the alternations in the rotor circuit is near a predetermined value. Such devices have the disadvantages of not being extremely accurate as they are generally operable over a wide range of frequency. Also, they are costly and at best extremely delicate and easily lose their adjustment. In order to make a system operative in accordance with the value of rotor current, either directly, or indirectly in response to the rotor voltage which is proportional to the rotor current, complicated compound relays have heretofore been necessary. Since the secondary voltage, current, and frequency all change in a similar manner as the speed of the motor changes, an ordinary single coil relay having the usual inductive reactance and connected across some portion of the rotor circuit to be influenced by the voltage will have a current flowing therein, which is proportional to the rotor frequency divided by the product of the rotor frequency and the inductance of the coil itself. This proportional relation, however, remains substantially a constant, since the frequency, the principal variable, is cancelled from the proportion. No accurate response of the relay is therefore obtainable.

Figure 3:
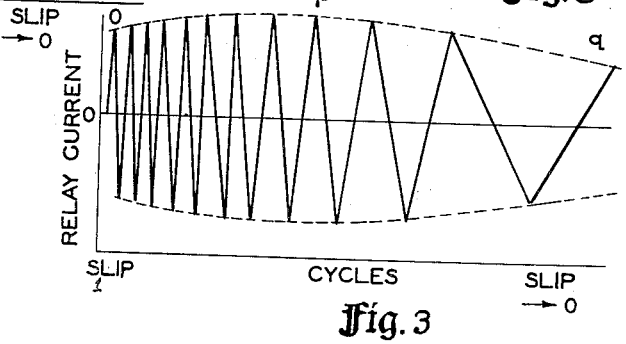
Fig. 3 is a diagrammatic representation of the alternating current induced in an inductive circuit connected so as to be energized from the rotor circuit during acceleration of rotor.

The graphical representation of Fig. 3 shows that although the frequency of current in such an inductive relay circuit decreases as the motor accelerates, the current does not decline in magnitude as does the rotor current. The current at points $p$ and $q$ is practically the same as that at point $o$ for the reason that as the frequency decreases, more current tends to flow in the inductive circuit, but at the same time, the rotor current also decreases and consequently the voltage tending to force current through the inductive circuit decreases. These two influences are substantially equal in effect and opposed, one tending to permit more current to flow and the other tending to cause less current to flow, thus resulting in a substantially constant current.

This tendency toward constant current is also responsible for unreliability of compound relays or relays having special magnetic circuits connected in a similar manner because as long as the coil circuits are inductive, the coil current tends to remain constant and flux changes in the relay are not sufficiently great for accurate operation. Although the rotor circuit electrical characteristics vary sufficiently so that the variations thereof could operate the usual inductive relay, if such variations could impose, on the relay circuit, either themselves or corresponding variations without material change, such variations cannot impose themselves or corresponding variations on the relay circuit because of the inductive effects inherent in the relay circuit itself, which inductive effects balance and prevent the imposition upon the relay circuit by the variations in the rotor circuit electrical characteristics of themselves or corresponding variations necessary for operation of the relay.

By means of the present invention, these inductive effects of the relay circuit are eliminated and the relay circuit rendered capacitive so that the variations in the rotor circuit electrical characteristics may impose themselves or corresponding variations on the relay circuit and thereby cause the relay to operate in accordance with the variations in the rotor circuit electrical characteristics.

In order to overcome this failure of inductive relays to provide any practical and simple control and to render the relay circuit capacitative, a condenser is connected in series with a sensitive relay across a portion of the secondary circuit of the rotor. The current flowing in the relay circuit comprising part of the present invention is given by the formula:

$$i = \frac{V}{\sqrt{\left(wL - \frac{1}{wC}\right)^2 + R^2}}$$

where V is the voltage drop across the secondary, $w$ is $2\pi$ times the secondary frequency, and L is the inductance, C the capacitance, and R the resistance of the relay circuit. If the inductance and resistance of such circuit are made small, as by using the proper type of sensitive relay, the capacitance and frequency will actually determine the amount of current flow. The current in such a circuit is then approximately proportional to the combined product of voltage, frequency and capacitance, and decreases rapidly as the motor accelerates.

This is illustrated in the graph of Fig. 4, which shows that the frequency of the current in such a relay circuit decreases, as illustrated in Figs. 2 and 3, as the motor accelerates, and that the relay current decreases rapidly in value as the motor accelerates, decreasing even more rapidly than the rotor current shown in Fig. 2, instead of remaining substantially constant as in an inductive circuit, as shown in Fig. 3. In Fig. 4, $r$ represents the current in the relay circuit at the instant that power is applied to the motor primary. Between points $r$ and $s$, the motor current has decreased rapidly and at point $t$ the current is approximately zero.

The new control system, including a relay circuit which has been rendered capacitively reactive in accordance with the present invention for obtaining this rapid current decrease, may be used to control the switching operations of a wound rotor induction motor, as will now be explained.

Figure 1:
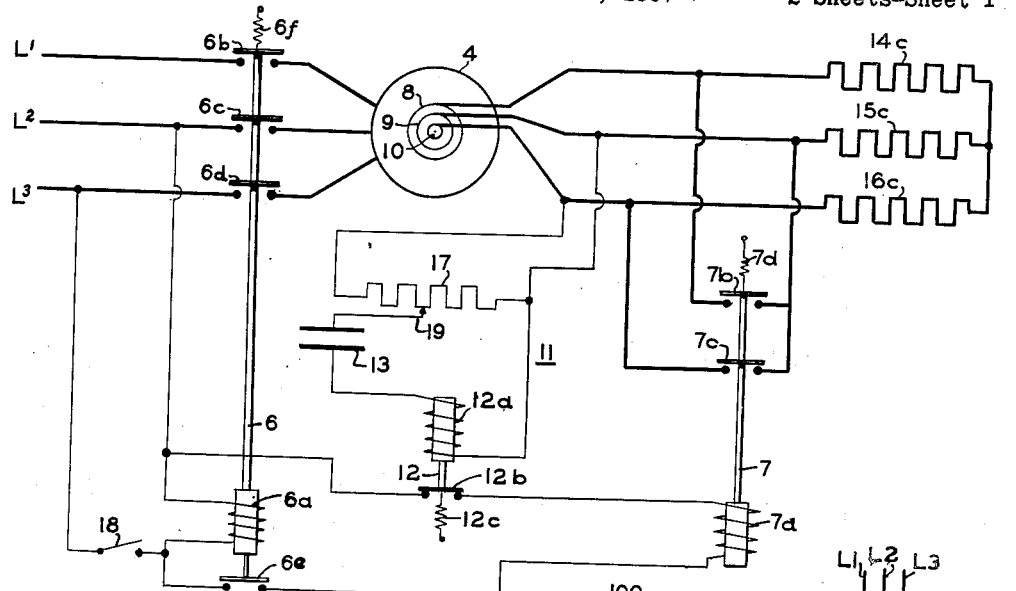
Fig. 1 is a simplified wiring diagram illustrating the invention and the manner in which the invention may be used for controlling the operations of a wound rotor induction motor.

Referring to Fig. 1, supply lines L1, L2, and L3 lead from a source of polyphase alternating current energy (not shown) to the primary of a wound rotor induction motor 4 through contacts 6b, 6c and 6d, respectively, of an electromagnetic switch 6. The secondary or rotor circuit windings of the induction motor 4 are connected to slip rings 8, 9 and 10. The rotor circuit includes Y-connected resistances 14c, 15c and 16c which are connected to the slip rings 8, 9 and 10, respectively. An electromagnetic switch 7 is arranged to short circuit the resistances 14c, 15c and 16c by means of contacts 7b and 7c. For controlling the operation of switch 7, there is provided a relay circuit 11 which includes a relay 12, a condenser 13 and a resistance 17. A knife switch 18 controls the operation of the electromagnetic switch 6, the switch 6 being actuated by a coil 6a and biased to its normal position by a spring 6f. In addition to the normally open contacts 6b, 6c and 6d, which control the flow of current to the motor, the switch 6 has normally open contacts 6e which control the flow of current to the coil 7a of switch 7. Switch 7 is biased to the open position by means of spring 7d, thus normally including resistance sections 14c, 15c and 16c in the rotor circuit. The relay 12 has an operating coil 12a connected in series with the condenser 13 across the resistance 17, which resistance is connected across the slip rings 9 and 10 of the rotor circuit. An adjustable connector 19 is provided to permit adjustment of the voltage applied to the relay 12. The contacts 12b of the relay 12 are held in normally closed position by means of the spring 12c when the coil 12a is deenergized.

In operation, assuming that power is supplied to lines L1, L2 and L3, if switch 18 then is closed, the coil 6a of the switch 6 will be energized and close the contacts 6b, 6c and 6d, thereby applying power to the motor 4 and causing rotation thereof. Simultaneously with the closure of the contacts 6b, 6c and 6d, the contact 6e will close, tending to complete a circuit to the coil 7a of the switch 7. Before the switch 7 can close its contacts, however, the potential induced in the secondary or rotor circuit by current flowing in the primary circuit of the motor 4 due to closure of switch 6 will have so influenced the coil 12a of the relay 12, that the contacts 12b will have opened to prevent energization of the coil 7a. The motor then accelerates with the resistances 14c, 15c and 16c Y-connected in the rotor circuit. As the motor increases in speed, the current in the rotor or secondary circuit decreases, as shown in Fig. 2, and the current in the relay circuit 11 decreases, as shown in Fig. 4. When the current in the coil 12a has reached a predetermined value such as $s$ in Fig. 4, the contacts 12b of the relay 12 close. Upon the closure of these contacts, coil 7a is energized to operate switch 7 and close contacts 7b and 7c to short circuit resistances 14c, 15c and 16c. The elimination of the resistances 14c, 15c and 16c from the rotor circuit permits the motor to accelerate to its maximum speed.

It is thus seen that by virtue of the improved control system and relay circuit, an ordinary relay may be utilized and is rendered operative in response to variations in the electrical characteristics of the rotor circuit of a wound rotor induction motor. If it were not for the capacitive effect of the condenser 13, the inductance of the coil 12a of the relay 12 would so influence the current flowing in the relay circuit 11 as to make it substantially constant, as shown in Fig. 3, and render the control system inoperative for its intended purpose. The addition of the condenser 13 removes the tendency of an inductive circuit to maintain the current flowing therein constant under conditions of decreasing frequency and decreasing magnitude of applied voltage and so increases the rate of current decrease as to make possible the use in the control system of an ordinary relay to time acceleration operations in accordance with the motor speed.

Referring next to the more detailed illustration in Fig. 5 of the system heretofore broadly disclosed in Fig. 1, a system utilizing a group of such relay circuits to control numerous motor switching operations is illustrated.

In Fig. 5 the supply lines L1, L2 and L3 are connected to the source of polyphase alternating current energy (not shown). The line L1 is shown as directly connected to the usual primary, which primary is indicated by the circle designated 5 of the wound rotor induction motor 4, while the lines L2 and L3 are shown as reversibly connected thereto by electromagnetic reversing switches 20 and 21. The usual secondary or rotor windings (not shown) of the induction motor 4 are connected to the slip rings 8, 9 and 10. The rotor circuit includes a Y-connected resistance bank arranged in groups A, B and C, each group including three resistances designated by numerals 14, 15 and 16 with lower case suffixes corresponding to the group. For example, group C includes resistances 14c, 15c and 16c. Corresponding resistances of all groups are connected in series forming series-connected sections, such, for example, as the section comprised of resistances 14a, 14b and 14c. Each section is connected to a different one of the slip rings 8, 9 and 10. Three electromagnetic switches 40, 41 and 42 are provided and arranged to short circuit the resistance groups A, B and C, respectively. Resistance group A is used as the plugging resistance, and resistance groups B and C are used either as an accelerating resistance or a speed regulating resistance.

The switch 40 is the plugging contactor and is arranged to short circuit the plugging resistance group A whenever group A is not used to limit the rotor current, as will be explained hereinafter. The switches 41 and 42 are the accelerating contactors and are used either to short circuit the accelerating resistance groups B and C, respectively, as the motor accelerates, or to regulate the motor speed. Three relay circuits 50, 51 and 52 control the operation of the switches 40, 41 and 42, respectively. A relay circuit 46 controls the removal of reverse power after a braking operation, and a master switch 60 permits selective operation of the switches 20, 21, 40, 41 and 42 to control the direction of rotation, acceleration and speed of the induction motor 4.

The reversing switches 20 and 21 have operating coils 28 and 29, respectively. The switch 21 has normally open contacts 21a and 21b for controlling the flow of current to the motor 4 and normally closed auxiliary contacts 21c bridged by a member 21e and normally open contacts 21d bridged by the member 21e when the switch 21 is in the closed position. Likewise, the switch 20 has normally open contacts 20a and 20b for controlling the flow of current to the motor 4 and normally closed contacts 20c bridged by a member 20e and normally open contacts 20d bridged by the member 20e when the switch 20 is in the closed position. The springs 20f and 21f bias the switches 20 and 21 to their normal positions respectively. The switches 40, 41 and 42 have operating coils 43, 44 and 45, respectively. The switch 40 has two normally open contacts 40a and 40b for short-circuiting the resistance group A and normally open auxiliary contacts 40c which are connected by a member 40d when the contacts 40a and 40b are closed. The switch 41 is the first accelerating contactor and has normally open contacts 41a and 41b for short-circuiting the resistance group B and normally open auxiliary contacts 41c connected by a member 41d when the contacts 41a and 41b are closed. The switch 42 is the last accelerating contactor and has normally open contacts 42a and 42b which, when closed, short-circuit the resistance group C and thus eliminate all external rotor resistance. The springs 40f, 41f and 42f bias the switches 40, 41 and 42 to the normal positions thereof respectively.

Each of the relay circuits 46, 50, 51 and 52 are energized from the slip rings 9 and 10 to which they are connected by means of conductors 22 and 23, although they might be energized from any portion of the rotor circuit wherein there is a potential difference of sufficient magnitude to cause operation.

The relay circuit 50 controls the operating of the plugging switch 40 and includes a condenser 24 connected in series with an operating coil 56a of the relay 56, which relay has contacts 56b held in a normally closed position by a spring 56c. The relay circuit 51 controls the operation of the accelerating switch 41 and includes a condenser 25 connected in series with an operating coil 57a of the relay 57. The relay 57 has contacts 57b held in a normally closed position by a spring 57c. The relay circuit 52 controls the operation of the accelerating switch 42 and includes a condenser 26 connected in series with an operating coil 58a of the relay 58. The relay 58 has contacts 58b held normally closed by a spring 58c. The relay circuit 46 includes a condenser 27 connected in series with an operating coil 59a of the relay 59, which relay has contacts 59b and 59e which are held normally open by a spring 59c. The relay coils 56a, 57a, 58a and 59a are shunted by adjustable resistances 56d, 57d, 58d and 59d, respectively, to provide control of the amount of current flowing in each of the relay coils for predetermined voltages across the slip rings 9 and 10 in order to permit selective operation of the relays 56, 57, 58 and 59 under conditions of varying rotor circuit electrical characteristics.

The master switch 60, shown for purposes of illustration, is of the face-plate type, having an arm 61 pivoted at 62 so as to be movable to engage selectively various combinations of contact segments 70 to 77, inclusive. In the particular master switch illustrated, the arm 61 is movable to three positions, F1, F2 and F3, each of which provides a different forward speed of rotation of the motor 4, and to three positions, R1, R2 and R3, each of which provides a different reverse speed of rotation of the motor 4. By means of the master switch 60, the motor can be accelerated in each direction of rotation or operated at the selected speed in each direction.

When the arm 61 is moved so as to contact various combinations of the segments 70 to 77, inclusive, the segments so contacted are electrically connected to each other through the arm 61.

The operation of the system for normal acceleration from rest will now be described:

If power is supplied to the lines L1, L2 and L3, and the arm 61 of the master switch 60 moved to position F1 in the forward direction, a circuit will be completed from the line L3, through conductors 31 and 32, the segment 77, the arm 61, and the segment 76 of the master switch 60, a conductor 33, the normally closed contacts 21c of switch 21, a conductor 34, the coil 28, and a conductor 35 to the power line L2. This will cause energization of the coil 28 and operation of the switch 20, and closure of the contacts 20a and 20b will connect the motor 4 to the supply lines L2 and L3 to energize the motor 4 for forward rotation.

As soon as power is supplied to the induction motor 4, a voltage of considerable magnitude and having a frequency the same as that of the source is induced in the rotor circuit of the motor 4, and such voltage causes a current of proportional magnitude and similar frequency to flow in the resistance groups A, B and C. The relay circuits 51 and 52 are so adjusted that relays 57 and 58 quickly operate to open their respective contacts 57b and 58b under this condition, but relay 56 which controls the insertion of the plugging resistance group C does not open its normally closed contacts 56b under this condition.

Immediately upon movement of the arm 61 to the first position forward, the switch 20 closes to apply power to the motor 4 and as the contacts 20d are then bridged by the member 20e, the plugging switch 40 closes to short circuit the plugging resistance group A. The energizing circuit for the coil 43 of the switch 40 is traced as follows: From the line L3, through conductors 31, 36 and 37, the closed contacts 56b of the relay 56, a conductor 38, the coil 43 of the plugging switch 40, a conductor 39, the contacts 20d, the bridging member 20e, and a conductor 46 to the power line L2.

Assuming now that the arm 61 is moved to position F2 in the forward direction, the circuit through the master switch 60 to the coil 28 of the switch 20 will not be altered, and a further circuit will be set up from the line L3, through the conductor 31, the segment 77, the arm 61, the segment 75, and a conductor 47 to the now open contacts 57b of the relay 57. Since the frequency and magnitude of the voltage in the rotor circuit reduces as the motor accelerates, the frequency and magnitude of the current through the coil 57a of the relay 57 by virtue of the condenser 25 will decrease in accordance with the curve of Fig. 4. At a predetermined value of rotor current contacts 57b will close and the circuit will be continued through a conductor 48, the contacts 40c bridged by the member 40d of the switch 40, a conductor 49, the coil 44 of the switch 41, and a conductor 53 to the line L2. Energization of the coil 44 causes closure of the contacts 41a and 41b of the switch 40 which will short circuit the resistance group B to permit further acceleration of the motor 4. It is thus seen that even if the arm 61 is moved quickly from the off position to the position F2, a circuit will not be completed to the first acceleration switch 41 until the motor has accelerated to a speed such that the voltage and frequency across the slip rings 9 and 10 have decreased to such a value that the current through the coil 57a of the relay 57 will have decreased to a predetermined drop-out value, which will permit the spring 57c to close the contacts 57b.

After a time, the motor 4 will have accelerated so that the magnitude and frequency of the rotor circuit voltage is such that the coil 58a will no longer hold the relay 58 in the open position and the contacts 58b will close. Assuming that the arm 61 of the master switch 60 has been moved to position F3 in the forward direction, a circuit will be set up to energize coil 45 of the switch 42 as follows: From the line L3, through conductor 31, the segment 77, the arm 61, the segment 74, a conductor 78, the segment 70, a conductor 54, the contacts 58b of the relay 58, a conductor 55, the contacts 41c of the switch 41 bridged by the member 41d, a conductor 63, the coil 45, and the conductors 64 and 53 to the line L2. Energization of the coil 45 causes operation of the switch 42 and closure of the contacts 32a and 32b which short circuit all of the external resistance of the rotor circuit to permit the induction motor 4 to rotate at its maximum speed.

If it is now desired to quickly reverse the motor 4 by plugging, that is, by applying reverse power quickly thereto, the arm 61 can be moved from position F3 in the forward direction to position R3 in the reverse direction. If this is done, the switch 20 will immediately be deenergized, and the switch 21 will be operated to closed position. Operation of switch 21 is accomplished over the following circuit: From line L3, through conductors 31 and 65, the segment 73, the arm 61, the segment 72, a conductor 66, the coil 29, a conductor 67, the contacts 20c of the switch 20 bridged by the member 20e, and the conductor 68 to the line L2. The closure of the contacts 20a and 20b of the switch 20 applies reverse power to the motor 4 which immediately causes a voltage of large magnitude and having a frequency nearly twice that of the source to be induced in the rotor circuit of the motor 4. Under this condition of rotor circuit electrical characteristics, the relay 56 is operatively energized and the contacts 56b open to interrupt the circuit to the coil 43 of the switch 40. The switch 40 then opens to remove the short circuit of the protective plugging resistance group A to render it effective in the rotor circuit to diminish to a safe value the amount of current flowing therein. Opening of the switch 40 will cause the opening of the contacts 40c to interrupt the circuits to the coils 44 and 45, and also the circuits to the coils 44 and 45 will be interrupted by the opening of the contacts 57b and 58b caused by the actuation of the relays 57 and 58 under these conditions of rotor circuit characteristics. The switches 41 and 42 are thus deenergized, simultaneously with switch 40, and reinsert the resistance groups B and C in the rotor circuit. The motor then decelerates to zero speed, reverses the direction of rotation and commences to accelerate in the reverse direction. Prior to this time, however, the relay 56 will have closed its contacts 56b to complete a circuit previously traced to the coil 43 of the switch 40, this closure being due to the change in the electrical characteristics of the rotor circuit resulting from deceleration of the motor. The switch 40 will close to short circuit the plugging resistance group A. As the motor accelerates in the reverse direction, the magnitude and frequency of the rotor current and voltage will decline to a predetermined value s, which will permit relay 57 to close. Closure of contacts 57b will permit closure of the switch 41, short-circuiting the resistance group B, and subsequently the contacts 58b of the relay 58 will close, which will permit closure of the switch 42, short-circuiting the resistance group C, thus eliminating all of the external rotor resistance so that the motor may rotate at the maximum speed in the reverse direction. The operating circuits for the switches 41 and 42 are essentially the same as those previously traced for rotation in the forward direction except that the segments 71 and 70 are used as were the segments 75 and 74, and a conductor 79 is used for connection between the segments 71 and 75. Had the arm 61 been moved from first, second or third position forward to first, second or third position reverse, a similar sequence of switching operations would have taken place except that the acceleration resistance groups B and C would not be shorted unless the arm 61 were moved to the positions R2 and R3, respectively, in the reverse direction.

It is thus seen that by using the control system herein disclosed for controlling the acceleration and plugging switching operations, these operations can be timed in accordance with the slip of the motor and consequently automatically occur at the proper instants during motor operation.

Heretofore, no mention has been made of the function of the relay circuit 46 and the relay 59, which are so adjusted that the coil 59a will be deenergized and the contacts 59b and 59e open when the slip of the motor is approximately unity or less and closed when the slip is greater than unity. Assuming that the arm 61 of the master switch 60 is in one of the three forward positions and that the motor is running in the forward direction and that it is desired to quickly stop the motor, the arm 61 can be moved to any of the three reverse positions to permit the opening of the switch 20 and the closure of the switch 21. Upon the operation of these switches, a surge of current will flow in the rotor circuit, as previously described in referring to the ordinary plugging operation. This electrical condition of the secondary circuit causes relay 59 to close its contacts 59b and 59e. Closure of the contacts 59b does not at this time complete any active circuit because the circuit therethrough is opened by movement of the member 21e away from the contacts 21c when the switch 21 closes. Closure of contacts 59e sets up a circuit traceable from the line L3 through the conductors 31, 36 and 69, the contacts 59e, the conductors 80 and 66, the coil 29 of the switch 21, the contacts 20c of the switch 20 bridged by the members 20e and the conductors 68 and 46 to the line L2. Thus the contacts 59e parallel the connection through the arm 61 and segments 73 and 72 of the master switch 60. If, immediately after closure of the switch 21, the arm 61 is moved to the off position, current will continue to flow through the coil 29 of the switch 21 and reverse power will continue to be applied to the motor 4 until such time as zero speed is approached. As the motor 4 approaches zero speed, the slip approaches unity, and at a predetermined value thereof the relay circuit 46 permits the relay 59 to be operated to open position. The coil 29 is then deenergized to permit opening of the switch 21 and the complete removal of power from the motor 4. The speed of the rotor at this time is such that it quickly comes to rest. Had the arm 61 been in one of the reverse positions and then moved to one of the forward positions and then moved to the off position, a similar sequence would have taken place. The parallel circuit to the connection through the arm 61 and the segments 76 and 77 is traceable from the line L3, through the conductors 31, 36 and 69, the contacts 59b of the relay 59, the conductors 81 and 33, the contacts 21c bridged by the member 21e of the then opened switch 21, the conductor 34, the coil 28 of the switch 20 and the conductor 35 to the power line L2.

It is apparent that the induction motor controller shown in Fig. 5 employs essentially the system disclosed in Fig. 1 to regulate automatically the rate of acceleration, to insert plugging resistance, and to remove reverse power after braking action. Control of any one or a combination of these three or other switching operations can be accomplished without departing from the scope of the invention.

While the control system has been disclosed for illustration in connection with a wound rotor induction motor wherein its advantages are fully developed, it likewise may be used to advantage in connection with synchronous and other motors.

As diagrammatically illustrated in Fig. 6, it is also possible to couple to the shaft 90 of any prime moving motor 91 to be controlled, the shaft of a small wound rotor induction pilot motor 92 having its primary winding connected to a source of alternating current power L1, L2, L3, and derive the potential applied to the capacitative relay circuit from slip-rings connected to the rotor winding of the small induction motor. The capacitative relay circuit includes a relay 94, a condenser 95, and an adjustable resistance 96. The relay contacts 97 open and close a circuit 102 energized from a source 101. The circuit 102 includes an operating coil 98 of an electro-magnetic switch 99 which controls the rotor resistance 100 of the motor 91. In this motor mechanism, the frequency and magnitude of the induced current in the rotor of the pilot motor are directly proportional to the speed thereof and therefore proportional to the speed of the larger motor. Thus accurate control of the switching operations of the larger motor, or the pilot motor, or both, can be accomplished, the control of the speed of the pilot motor being through the medium of the larger motor which insofar as concerns the pilot motor, is part of the control system for the switching operations.

Though electromagnetic relays have been used heretofore in alternating current motor control circuits and have been found to operate to some extent in those instances wherein sensitive and accurate operation are unessential, they are substantially inoperative for all purposes requiring rapid and accurate response of the relay to the variations in the circuit to be controlled. For example, in controlling alternating current motors used for driving "run-out" tables, and for driving rolls and screw-down mechanism therefor, in steel mills, the accuracy and rapidity in response of the relay which are essential render the prior relay circuits inoperative for these uses, whereas the present control system is operative for these purposes.

Having thus described my invention, I claim:

1. The combination with an electric motor having a secondary circuit and connectable to a source of alternating current and controlling means for controlling the operation of said motor, of a capacitively reactive relay means for controlling said controlling means, said relay means being associated with said secondary circuit and responsive to a current substantially proportional to the combined product of the frequency of the current induced in the secondary circuit of the motor, the potential difference across a portion of said secondary circuit, and the capacitance of the relay means.

2. A control system for an alternating current motor of the wound rotor induction type, comprising means for establishing reverse power braking connections for said motor, means for limiting the braking current of said motor, an electro-responsive device including an energizing circuit having a preponderance of capacitive reactance when energized with currents of certain frequencies and connected to be responsive to a predetermined current proportional to the combined product of the potential difference across a portion of the rotor circuit, the frequency of the current in the rotor circuit, and the capacitance of the energizing circuit, for rendering said current limiting means ineffective, and responsive to a different predetermined current proportional to the combined product of the potential difference across a portion of the rotor circuit at a subsequent period of motor operation, the frequency of the current in the rotor circuit at said subsequent period of motor operation and the capacitance of the energizing circuit to render the current limiting means effective to limit the braking current of said motor.

3. A control system for an alternating current motor of the wound rotor induction type, means for establishing reverse power braking connections for said motor, a resistance connected in the rotor circuit of said motor having a portion for limiting the motor current during said braking operation and a portion for controlling the acceleration of said motor, a relay circuit associated with the rotor circuit and having at least a portion thereof series connected, said portion being capable of becoming series resonant, and said circuit being responsive to slips of unity or less for rendering said braking current limiting portion ineffective, said relay circuit being responsive to slips between unity and two when said braking operation is initiated to render said braking portion effective, and being responsive to a predetermined reduced value of slip as the motor decelerates and accelerates in the reverse direction to again render the braking current limiting portion ineffective.

4. Control apparatus for an electric motor, comprising means for applying forward power to the motor, means for applying reverse power to the motor while the motor is rotating in the forward direction, and means comprising a relay and a relay operating circuit including a capacitance and inductance and responsive to the electrical condition of a circuit of said motor for removing the application of reverse power when the motor is substantially at a standstill.

5. The combination with an induction motor having a series resonant primary winding and a rotor winding with a variable impedance, of a relay circuit responsive to variations in the electrical condition of said rotor winding, and rendered operative by said variations for controlling the variability of said impedance in predetermined relation to said electrical condition.

6. A control system responsive to variations in the electrical condition of a winding of an electric motor to be controlled by said system and comprising a plurality of electro-responsive means, each of which is capable of being operatively influenced in response to variations when such variations are imposed thereon, each of said electro-responsive means being such that when it is electrically associated with said system, its electrical properties normally would render the system substantially inoperative in response to said variations, a plurality of condensers, said condensers being associated with said electro-responsive means, respectively, and each condenser and electro-responsive means providing a control unit, and each condenser having a value of capacitance such that, when so associated with its electro-responsive means, said condenser eliminates those effects of the electrical properties of the associated electro-responsive means, which normally would render the system inoperative, each of said units being responsive to different predetermined variations in the electrical condition of the winding of the electric motor, whereby the control system, is selectively responsive to a number of different predetermined variations in the electrical condition of the winding.

7. The combination with an alternating current motor having a secondary circuit and a control system for the motor including a relay and a relay circuit, said relay circuit being associated with said secondary circuit and having an operating coil for the relay therein, the relay circuit and coil being such that, when they are electrically associated with said secondary circuit, their inductance normally would render the control system substantially inoperative in response to variations in the electrical condition of the secondary circuit, of a condenser connected in said relay circuit in a manner that eliminates the effects of the inductance of the relay circuit and coil so as to render the control system, including the relay circuit and coil, responsive to the variations in the electrical condition of the secondary circuit.

8. The combination with an alternating current motor having a secondary circuit, a plurality of electroresponsive devices, and a plurality of operating circuits, said operating circuits being associated with said electroresponsive means respectively and with said secondary circuit for selectively controlling the operation of the motor in response to variations in the electrical condition of said secondary circuit, each of said electro-responsive devices being such that, when its associated operating circuit is operatively associated with said secondary circuit, its inductive effects normally would render it substantially inoperative in response to the variations in the electrical condition of the secondary circuit, of means in each of the operating circuits for eliminating the inductive effects of its associated electroresponsive device and for rendering each operating circuit capable of becoming capacitively reactive under different predetermined variations in the secondary circuit to permit different predetermined variations in the secondary circuit to be selectively effective in each of the operating circuits to cause accurate selective operation of the associated electroresponsive devices in response to the variations in the electrical condition of the secondary circuit.

9. The combination with a wound rotor induction motor and switching means for controlling the operation of said motor, of an electro-responsive means electrically associated with the rotor circuit of said motor and capable of becoming capacitively reactive under a predetermined electrical condition of the rotor circuit and when capacitively reactive being operable to control said switching means.

10. The combination with an electric motor and switching means for controlling the operation of said motor, of a plurality of relay circuits for controlling the switching means, each of said relay circuits including a condenser and a relay operating coil connected in series and each of which is associated with a circuit of said motor in a manner to be responsive to control said switching means in accordance with a different predetermined electrical condition of said circuit of the motor, whereby the switching means is selectively responsive to a number of different predetermined variations in the electrical condition of said circuit.

11. The combination with an alternating current motor having a stator winding and a rotor winding, a starting resistance for the motor, and means to short circuit said resistance, of a relay circuit having a preponderance of capacitive reactance at some frequencies and responsive to the electrical condition of the rotor winding to permit the short-circuiting of said resistance by said means when the frequency of the induced current in the rotor winding is relatively low, said relay circuit having a preponderance of inductive reactance at other frequencies and being responsive to the electrical condition of the rotor winding to prevent the short-circuiting of said resistance when the frequency of the induced current in the rotor winding is relatively high.

12. Control apparatus for an electric motor, comprising means for controlling the rate of application of power to the motor to control the acceleration of the motor, and a plurality of relay circuits, each of which is associated with a circuit of the motor for selectively controlling said means, each of said relay circuits including capacitive and inductive reactances respectively adjustable to produce a series resonant condition in each of said relay circuits depending upon a predetermined electrical condition of said associated motor circuit, said relay circuits being so adjusted that series-resonant conditions occur in each of said relay circuits in predetermined sequence as the motor accelerates.

13. A control system for an alternating current motor of the wound rotor induction type, comprising means for establishing reverse power braking connections for said motor, means for limiting the braking current of said motor, and an electro-responsive means responsive to the electrical condition of the rotor circuit for controlling said current-limiting means, said electro-responsive means being inductively reactive at slow speeds of said motor and responsive to the electrical condition of the rotor winding to render said braking current limiting means ineffective when said motor is started from rest, and being capacitively reactive when said reverse power connections are established and responsive to the electrical condition of the rotor winding to render the current limiting means effective.

14. Control apparatus for an electric motor mechanism, comprising means to control the acceleration of said mechanism in a step by step manner, and a plurality of relay circuits, each of which is energized in accordance with the electrical condition of a circuit of said motor mechanism and each of which is capable of becoming series resonant at a different predetermined frequency to control said means in a step by step manner.

15. A control system for an alternating current motor of the wound rotor induction type, comprising means for establishing forward power connections for the motor to accelerate the motor in the forward direction, means for establishing reverse power connections for the motor to accelerate the motor in the reverse direction, adjustable resistance means in said rotor circuit, adjusting means for adjusting the amount of said resistance in the rotor circuit to control the rate of acceleration of said motor in either the forward or reverse direction, and means for controlling said adjusting means comprising a plurality of relay circuits, each of said relay circuits being responsive to the varying electrical condition of a circuit of the motor as the motor accelerates in either direction, each of said relay circuits including a condenser, relay operating coil, and a variable resistance interconnected in a manner so that different adjustments of the several resistances cause selective deenergization of said relay circuits as the motor accelerates due to the phenomenon of electrical series resonance, said selective deenergization causing periodic intermittent operation of said adjusting means as the motor accelerates in either the forward or reverse direction.

16. The combination with a wound rotor induction motor and switching means for controlling the operation of said motor, of an electro-responsive means electrically associated with the rotor circuit of said motor, means to energize said motor, said electro-responsive means being inductively reactive when said motor is energized and rotating at slow speeds to prevent the operation of said switching means, and said electro-responsive means being capable of becoming capacitively reactive at higher speeds of said motor and, when capacitively reactive, operative for effecting operation of said switching means.

JOHN D. LEITCH.

CERTIFICATE OF CORRECTION.

Patent No. 2,165,491.                               July 11, 1939.

JOHN D. LEITCH.

It is hereby certified that error appears in the printed specification of the above numbered patent requiring correction as follows: Page 6, second column, line 54, claim 5, strike out the words "series resonant" and insert the same before "relay" in line 56, same claim; and that the said Letters Patent should be read with this correction therein that the same may conform to the record of the case in the Patent Office.

Signed and sealed this 19th day of September, A. D. 1939.

Henry Van Arsdale,
Acting Commissioner of Patents.

(Seal)